(12) United States Patent
Wang

(10) Patent No.: US 7,104,370 B2
(45) Date of Patent: Sep. 12, 2006

(54) DRUM BRAKE ASSEMBLY

(75) Inventor: Nui Wang, Croydon (AU)

(73) Assignee: PBR Australia Pty Ltd., (AU)

( * ) Notice: Subject to any disclaimer, the term of this patent is extended or adjusted under 35 U.S.C. 154(b) by 0 days.

(21) Appl. No.: 10/790,481

(22) Filed: Mar. 1, 2004

(65) Prior Publication Data
US 2005/0000768 A1 Jan. 6, 2005

Related U.S. Application Data

(63) Continuation of application No. PCT/AU02/01185, filed on Aug. 30, 2002.

(30) Foreign Application Priority Data
Aug. 31, 2001 (AU) .................................. PR7425

(51) Int. Cl.
F16D 51/00 (2006.01)
(52) U.S. Cl. ....................................... 188/340; 188/336
(58) Field of Classification Search ................ 188/340, 188/330
See application file for complete search history.

(56) References Cited
U.S. PATENT DOCUMENTS 1,913,156 A * 6/1933 Frehse ......................... 188/337
2,024,847 A * 12/1935 Chambers .................... 188/138
2,057,749 A * 10/1936 Tatter ......................... 188/79.51
2,273,223 A * 2/1942 Sawtelle ...................... 188/363
2,596,379 A * 5/1952 Dodge ....................... 188/79.63
3,869,026 A * 3/1975 Williams ................. 118/79.63
5,246,093 A * 9/1993 Wang ........................... 188/336

* cited by examiner

Primary Examiner—Robert A. Siconolfi
(74) Attorney, Agent, or Firm—Lerner, David, Littenberg, Krumholz & Mentlik, LLP

(57) ABSTRACT

A drum brake assembly which includes a rotatable drum having a radially inner drum braking surface and a brake shoe of single piece construction and of generally circular form mounted within the drum and against a backing plate. The brake shoe includes friction lining and at least one flange projecting radially inwardly. The brake shoe has positioning arrangement for positioning the brake shoe within the drum in an inoperative condition against lateral movement into engagement with the drum braking surface, to provide for complete clearance between the friction lining and the drum braking surface in the inoperative condition. The positioning arrangement includes an engagement member for engagement with an abutment arrangement. The abutment arrangement includes radially inner and outer abutments and the engagement member is arranged for engagement with the radially inner abutment in the inoperative condition of the assembly to position the friction lining away from the drum braking surface, and with the radially outer abutment when the brake shoe is radially expanded to the operative condition of the assembly.

19 Claims, 4 Drawing Sheets

DRUM BRAKE ASSEMBLY

CROSS-REFERENCE TO RELATED APPLICATIONS

This application is a continuation of International Application No. PCT/AU02/01185, filed Aug. 30, 2002 and published in English under International Publication No. WO 03/019031 on Mar. 6, 2003. The entire disclosure of International Application No. PCT/AU02/01185 and Australian Patent Application No. PR7425 is incorporated herein by reference.

BACKGROUND OF THE INVENTION

The present invention relates to a drum brake assembly and in particular to a drum brake assembly that employs a single piece brake shoe.

A drum brake assembly of that kind is disclosed in Applicant's U.S. Pat. No. 5,246,093. That patent discloses a friction lined brake shoe which is of generally circular loop form and which defines two separate and opposed ends. The patent further discloses a drum brake assembly, in which an actuator is disposed between the opposed ends of the brake shoe for increasing the separation of the ends during a brake application to thereby radially expand the shoe to an operative condition, in which the friction lining engages the drum braking surface. The brake shoe is constructed to resiliently distort during radial expansion and to act as a return spring when the actuating force between the opposed ends is released, to return the shoe to a radially contracted, inoperative condition, in which the friction lining is spaced from the drum braking surface.

The drum brake assembly disclosed in U.S. Pat. No. 5,246,093 advantageously reduces the number of brake components compared to prior art drum brake assemblies and it simplifies machining or grinding of the friction lining during brake shoe manufacture. The reduction in components achieved in the drum brake assembly of U.S. Pat. No. 5,246,093 includes a reduction in the number of components employed to secure the brake shoe in place against the backing plate and within the drum, and therefore, compared to prior art drum brake assemblies, the brake shoe of U.S. Pat. No. 5,246,093 is less constrained within the drum brake assembly. In that assembly, the brake shoe is not fully restrained against "floating" or shifting movement (hereinafter referred to as "lateral movement") across the backing plate when the drum brake assembly is in the inoperative condition. The brake shoe is not loose within the drum, as it is connected at the opposed shoe ends to the actuator and it is restrained against lifting away from the backing plate by spring clips or a conventional hold down spring, but those connections cannot under all circumstances, prevent the lateral movement referred to above. Thus, the brake shoe can, under certain circumstances, such as during excessive vibration, move laterally over the backing plate and that can cause the brake shoe to become misaligned within the drum when the drum brake assembly is in an inoperative condition, i.e., when there is no brake actuating load being applied, so as to reduce the running clearance between the friction lining and the drum braking surface below the set running clearance. In some circumstances, that misalignment may cause the brake shoe to engage the drum braking surface in the inoperative condition, which is undesirable.

It is an object of the invention to provide an improved brake assembly which employs a single piece brake shoe of the above described kind, in which the brake shoe is more reliably returned to a position spaced from contact with the drum braking surface in the inoperative condition.

SUMMARY OF THE INVENTION

The present invention provides a drum brake assembly which includes a rotatable drum having a radially inner drum braking surface and a brake shoe of single piece construction and of generally circular form mounted within the drum and against a backing plate. The brake shoe has a radially outer face and friction lining mounted thereon in facing relationship to the radially inner drum braking surface. The radially outer face of the brake shoe is formed by the radially outer face of an elongate web and the brake shoe includes at least one flange co-extending with the web and projecting radially inwardly from the web. The brake shoe has two separate and opposed ends, and an actuator positioned between the ends and being operable to enlarge the separation between the ends and to thereby cause radial expansion of the brake shoe from an inoperative brake off condition, in which there is clearance between the friction lining and the radially inner braking surface, to an operative brake on condition, in which the friction lining engages the drum braking surface. A positioning arrangement is provided for positioning the brake shoe within the drum in the inoperative condition against lateral movement into engagement with the drum braking surface, to provide for complete clearance between the friction lining and the drum braking surface in the inoperative condition. The positioning arrangement includes an engagement member which is associated with one of the brake shoe flange or the backing plate, for engagement with an abutment arrangement associated with the other of the brake shoe flange or the backing plate. The abutment arrangement includes radially inner and outer abutments and the engagement member is arranged for engagement with the radially inner abutment in the inoperative condition of the assembly to position the friction lining away from the drum braking surface, and with the radially outer abutment when the brake shoe is radially expanded from the inoperative condition through the set running clearance between the friction lining and the drum braking surface to the operative condition of the assembly. One of the engagement members or the abutment arrangement is formed as a displaceable member which is displaceable radially relative to the brake shoe flange or backing plate with which it is associated for the purpose of maintaining the set running clearance between the friction lining and the drum braking surface upon lining wear. Engagement between the engagement member and the abutment arrangement in the inoperative condition is facilitated by a biasing arrangement which biases the brake shoe to return to the inoperative condition. The biasing arrangement may include a function of the brake shoe itself, so that during radial expansion of the brake shoe, the shoe undergoes resilient distortion and therefore functions as a return spring when the shoe is radially expanded to radially contract the shoe when the actuating load is released. The biasing arrangement may also include bias springs which act on the shoe to return the shoe to a position of engagement between the engagement member and the abutment arrangement. In a preferred arrangement, the shoe functions as a return spring for radial contraction, while biasing springs function to ensure engagement between the engagement member and the abutment arrangement. Other bias arrangements may also be suitable.

The present invention further provides a brake shoe for use in a drum brake assembly, the brake shoe being of generally circular form and including an elongate web having a radially outer face on which friction lining is mounted, and a flange co-extending with the web and projecting radially inwardly therefrom. The brake shoe has two separate and opposed ends and in use, an actuator positioned between the ends is operable to increase the separation between the ends to radially expand the shoe. The flange of the brake shoe includes one portion of a positioning arrangement that is provided in a drum brake assembly in which the brake shoe is employed and that portion is either the engagement member or the abutment arrangement, the latter of which in use defines radially inner and outer abutments. The other portion is associated with the backing plate of the drum brake assembly and in use, the two portions are cooperable to position the friction lining of the brake shoe for complete clearance relative to the drum braking surface of the drum brake assembly, in an inoperative condition of the assembly. The cooperation between the engagement member and the abutment arrangement involves engagement by the engagement member with the radially inner abutment in the inoperative condition to position the friction lining away from the drum braking surface, and with the radially outer abutment in the operative condition. One portion of the positioning arrangement is displaceable and preferably that is the portion associated with the flange. That portion may be a displaceable member which is displaceably mounted thereon and radial displacement of the displaceable member relative to the flange is effective to maintain the set running clearance between the friction lining and the drum braking surface as the lining wears.

The present invention further provides an abutment arrangement or an engagement member of the above kind which is formed as a displaceable member for fixing to either of the flange of a brake shoe according to the invention, or to the backing plate of a drum brake assembly according to the invention. The abutment arrangement or engagement member is formed to be displaceable radially in use.

The positioning arrangement described above can provide engagement between the engagement member and the abutment arrangement at a single position or region, or at two or more positions or regions about the brake shoe. In this respect, the biasing arrangement, including the inherent bias of the brake shoe and a biasing spring arrangement, can be employed to ensure that there is appropriate engagement in the inoperative condition between the engagement member and the abutment arrangement. In the preferred arrangement, the positioning arrangement acts between the brake shoe and the backing plate at two positions, preferably but not necessarily symmetrically about a centre line which extends between the opposed ends of the brake shoe, and preferably in the region of 30°–60° on either side of the centre line.

The drum brake assembly according to the invention advantageously is operative to position the brake shoe for clearance between the friction lining and the drum braking surface in the inoperative condition. That is, engagement between the engagement member and the abutment arrangement in the inoperative condition positively positions the brake shoe within the drum for friction lining clearance from the drum braking surface and therefore, the set running clearance is achieved in that condition. Moreover, the displaceable nature of one portion of the positioning arrangement permits compensation for friction lining wear to maintain the running clearance as set.

The set running clearance is the desired clearance between the friction lining and the drum braking surface. It may be measured at a point or points along the length of the friction lining and the clearance amount may vary through the length. The set running clearance is the optimum clearance which is a balance or trade off between the need to minimize the distance the friction lining travels before it engages the drum braking surface and the need to space the friction lining away from the drum braking surface in the inoperative condition to ensure that there is no contact between the friction lining and the dum braking surface in that condition. Engagement between the engagement member and the radially outer abutment will occur upon radial expansion of the brake shoe through the set running clearance, but, only if the brake assembly is correctly set, not if the radial expansion is less than the set running clearance. Radial expansion less than the set running clearance may occur for example, when the friction lining is new or unworn and the clearance between the lining and the drum braking surface is less than the set running clearance. It may also occur if the actuating means is set between the opposed ends of the brake shoe such as to resist radial contraction of the brake shoe sufficiently for the set running clearance to be achieved.

The backing plate referred to herein may alternatively be a dust shield and therefore, the expression "backing plate" is to be understood as including within its scope, a dust shield.

In a preferred arrangement, the displaceable member is formed as a spring clip which is fitted to either of the backing plate or the flange and which is secured thereto under spring load. The spring clip can be secured to the backing plate or the brake shoe flange in any suitable manner and for example, an opening may be provided in the backing plate to receive the spring clip and to permit the clip to engage opposite sides of the backing plate. In this example, the spring clip will be formed in a generally U-shape. Alternatively, the backing plate may include a mounting facility for mounting the spring clip and that facility may be formed integrally with the backing plate or can be attached thereto. That facility may include a mounting portion which is suitable for mounting a U-shaped spring clip. In an alternative arrangement, the spring clip may be of U-shape to engage opposite sides of the flange of the brake shoe. The displaceable member could alternatively take other forms.

For engagement with the abutment arrangement, the engagement member may include a projection. If the engagement member is formed as the displaceable member, the projection preferably is formed integrally with a mounting section of the engagement member, which mounting section is employed to mount the engagement member to either of the flange or the backing plate, such as the spring clip arrangement discussed above. Alternatively, the projection may be punched out of a planar section of the engagement member, or it may be fixed to such a section, such as by welding or threaded connection. Alternatively, if the engagement member is not the displaceable member, the projection could be formed depending directly from the flange or the backing plate, again say by punching or integral connection. Still alternatively, the projection could be an upturned edge of the engagement member, which forms a lip, depending preferably perpendicular to the flange or the backing plate. Such a lip may have only a shallow height or depth sufficient for engagement with the abutment arrangement and may therefore be formed as a step.

In a preferred form, the projection is circular, with its axis disposed substantially perpendicular to the plane of the brake shoe flange or the backing plate. In this form, the projection can be arranged to engage the abutment arrangement at each of two diametrically opposite circumferential positions of its outer circular periphery. That is, the circular projection will have a first point of circumferential engagement in the inoperative condition of the drum brake assembly and a second point of circumferential engagement which is diametrically opposite the first point in the operative condition.

The projection could alternatively be of a different shape, such as the shape known as "fish back", oval, elliptical, square or rectangular, or there may be more than a single projection.

The abutment arrangement can be of any suitable form suitable for abutting cooperation with the engagement member in each of the inoperative and operative conditions. The abutment arrangement could therefore be formed as a circular opening defining an internal circular surface and engagement with the abutment arrangement may be against diametrically opposite sides of that internal surface. Alternatively, the abutment arrangement could be formed as a circumferential or tangential groove or slot and engagement may be against opposed faces of the groove or slot. In either case, the arrangement preferably should allow circumferential movement of the brake shoe during brake application. Such movement is typically characteristic of single piece brake shoes and resistance to that movement is undesirable.

The abutment arrangement preferably is formed as an opening machined or punched into the backing plate of the drum brake assembly or the flange of the brake shoe, although it may be formed as a component part which is fixed to the backing plate or flange and that part may be formed as the displaceable member, say as a spring clip. Accordingly, it will be appreciated that either of the engagement member or the abutment arrangement can be formed as a separate and attachable component and that either of these can form the displaceable member. If each is formed as an attachable component, then preferably only one is formed to be displaceable (in terms of the invention) and the other is fixed. The fixed component may still be formed as a spring clip, but with a loading greater than that of the displaceable member, to maintain its position against displacement. Alternatively, it may include an interlocking arrangement with the flange or the backing plate. Still alternatively, the invention could be achieved by each component being displaceable but that is likely to increase the complexity of the drum brake assembly.

The type of engagement described above is generally of line engagement between the engagement member and the abutment arrangement, but it is equally possible that the engagement be across a broad surface. The engagement surfaces may, for example, be shaped for nesting engagement and could include cooperating surfaces that nest together, such as convex and concave nesting surfaces.

The radially inner and outer abutments of the abutment arrangement are spaced apart a distance which permits the brake shoe to expand and contract radially between the inoperative and the operative conditions through the set running clearance and for there to be engagement between the respective abutment arrangement and the engagement member at each of those conditions. As discussed earlier, if the radial expansion is less than the set running clearance, then there will be no engagement between the engagement member and the radially outer abutment in the operative condition. In the arrangements described above, in which the engagement member includes a projection which can shift between the abutments during brake shoe expansion, the distance between the inner and outer abutments can be the combined total of the maximum radial extent of the projection as measured between the inner and outer abutments, and the desired or set running clearance between the friction lining and the inner drum braking surface. This separation between the inner and outer abutments permits the brake shoe to expand and contract between the inoperative and operative conditions an amount equal to the set running clearance. For example, the spacing between the inner and outer abutments when the projection is circular, would be equal to the combined total of the outer diameter of the projection plus the set running clearance.

The above arrangement provides for positive clearance between the friction lining and the drum braking surface, in the inoperative condition of the drum brake assembly by engagement of the engagement member with the radially inner abutment or abutments. By that engagement, the brake shoe is restrained against lateral movement within the drum in the inoperative condition, so that engagement of the friction lining with the drum braking surface is prevented in the inoperative condition. Additionally, when the friction lining has worn, the engagement means will engage the outer radial abutment substantially simultaneously with friction lining engagement with the drum braking surface. That engagement causes the displaceable member to be displaced radially outwardly relative to the backing plate or flange to which it is attached as the actuating arrangement continues to expand the brake shoe radially. That displacement repositions the displaceable member so that the radially inner abutment is displaced radially outwardly. The displaceable member will be displaced an amount relative to the lining wear in the adjacent region of the lining. When the drum brake assembly assumes the inoperative condition, the previous displacement of the displaceable member ensures the correct running clearance is achieved.

The present invention is applicable to any form of single piece brake shoe which includes a flange that extends radially inward from a friction lining supporting web and which is mounted on a backing plate or the like. The invention is particularly suitable for the type of brake shoe disclosed in U.S. Pat. No. 5,246,093, which is of channel shaped cross-sectional form, defining a generally circular web and a pair of parallel flanges depending radially inwardly from side edges thereof. In use, a first of the flanges is disposed against or adjacent the backing plate, while the second flange is spaced axially away from the backing plate. Either of the engagement members or the abutment arrangement can conveniently be attached to or formed on the first flange for cooperation with the other of the engagement member or the abutment arrangement formed in or attached to the backing plate preferably at a position which underlies the first flange. That arrangement can be very compact, so as not to interfere with other parts of the drum brake assembly.

Installation of the positioning arrangement preferably occurs before the drum brake assembly is assembled. In the preferred method of installation, the displaceable member is fitted to the flange of a single piece brake shoe secured in an installation jig, which simulates a drum brake assembly. An actuator disposed between the opposed ends of the brake shoe is actuated to radially expand the brake shoe to engage the friction lining against a simulated drum braking surface. In the simulated operative drum brake condition, the engagement means will engage the abutment means at the outer radial abutment and the displaceable member will be displaced, if required, to a set position. With the displaceable member thus set, the brake shoe can be assembled in the drum brake assembly. Advantageously, the accuracy with which the displaceable member is fitted in the jig to the brake shoe is not critical and this is important, given that the jig simulation may not be a precise simulation of each drum brake assembly. If the position of the displaceable member as set in the jig causes the local running clearance in the region of the displacement member in the actual drum brake assembly to be too great, then the engagement means will engage the outer radial abutment of the abutment means ahead of the friction lining engaging the drum braking surface. However, that will be corrected on first use of the drum brake assembly by the displaceable member being shifted radially outwardly during the first drum brake application. Conversely, any inaccuracy which results in the running clearance being too small can be corrected during drum brake assembly by the installation personnel, although it is preferred in the method of the invention, to set the displaceable member to always achieve a slightly larger than required running clearance, and rely on correction of that upon the first application of the drum brake assembly.

The attached drawings show example embodiments of the invention of the foregoing kind. The particularity of those drawings and the associated description does not supersede the generality of the preceding broad description of the invention.

DETAILED DESCRIPTION

Figure 1:
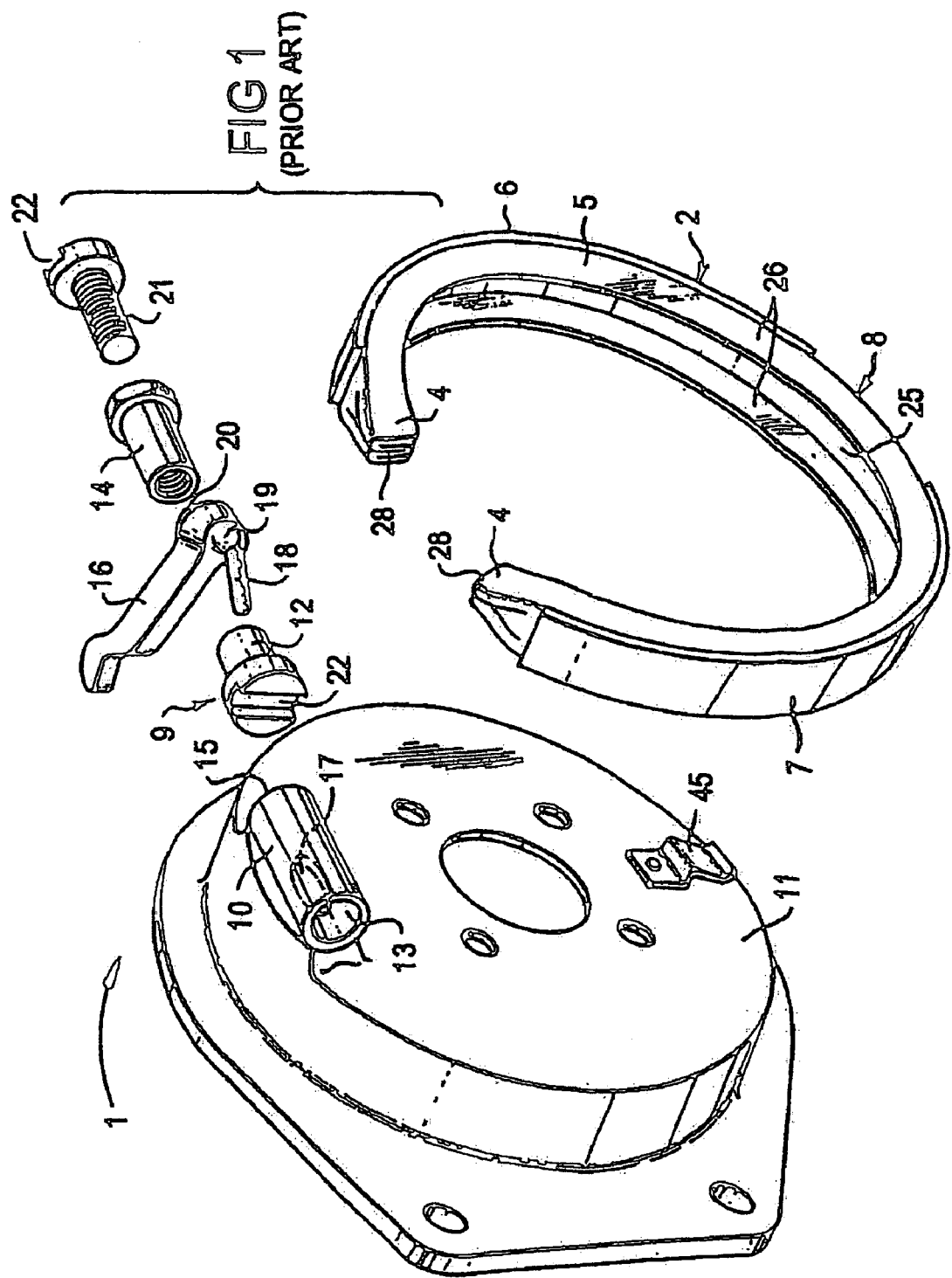
FIG. 1 is an exploded perspective view of a prior art drum brake assembly.
Figure 2:
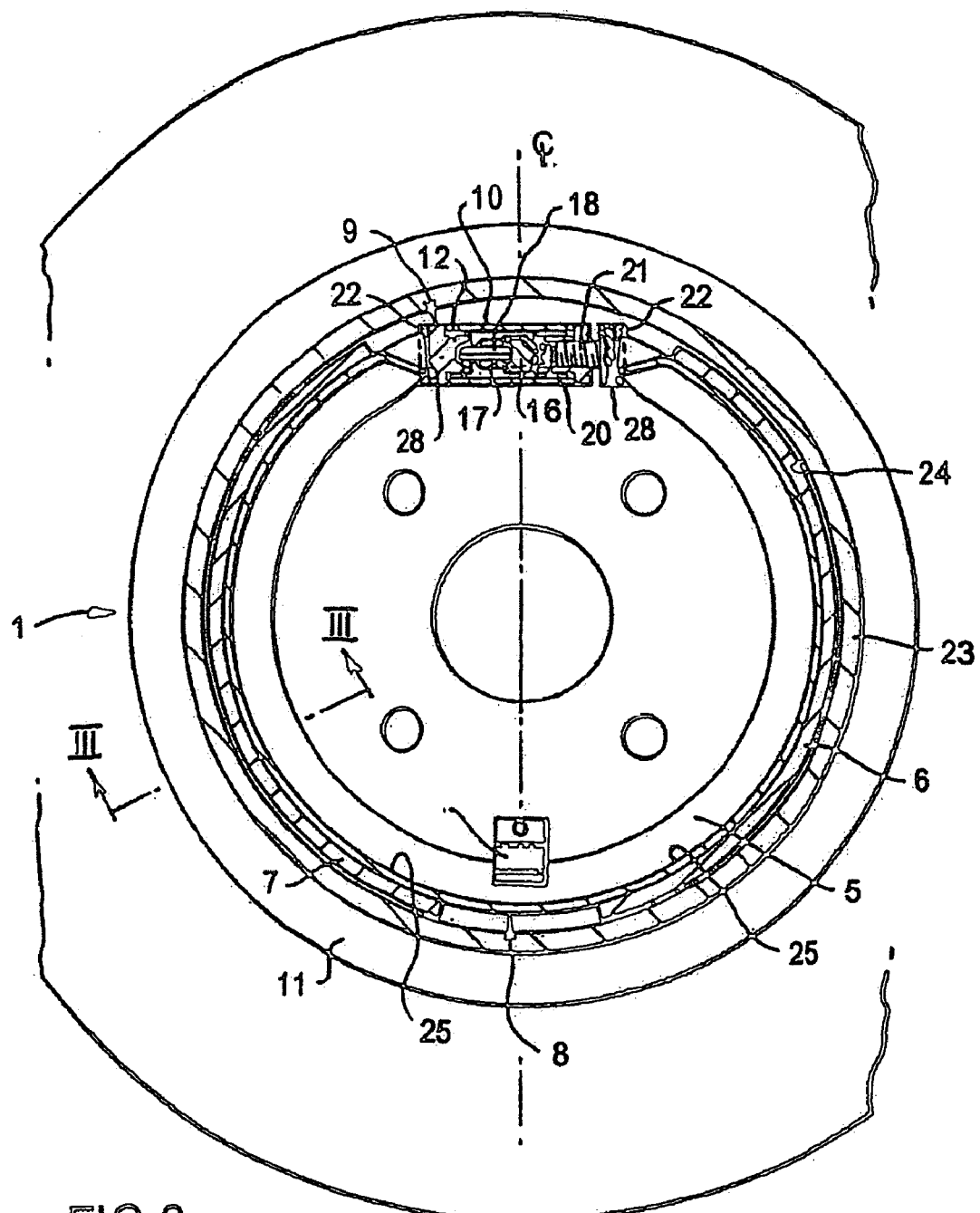
FIG. 2 is a front view of the prior art brake drum assembly shown in FIG. 1.

FIGS. 1 and 2 show prior art arrangements depicted in applicant's U.S. Pat. No. 5,246,093. Briefly, these figures show a parking brake assembly which includes a brake shoe 2 and a backing plate 11. The brake shoe 2 has a body 5 which is of U-shaped channel section defined by a circular web 25 and a pair of parallel flanges 26 extending radially inward from side edges of the web 25. The brake shoe 2 has a pair of friction linings 6 and 7 adhered to the radially outer face 8 of the web 25. The brake shoe defines opposed ends 28 and FIG. 1 shows an actuating arrangement 9 which is operable to enlarge the separation between the ends 28 and thereby to radially expand the brake shoe 2, for engagement with a drum braking surface (see FIG. 2) circumferentially arranged with respect to the brake shoe 2. Attached to the backing plate 11 is a hold down spring 45 and FIG. 2 shows that spring 45 extending over the edge of one of the flanges 26. The combination of the hold down spring 45 engaging over the flange 26 and the cooperation between the shoe ends 28 in the grooves 22 of the actuating arrangement 9, prevents the brake shoe 2 from lifting away from the backing plate 11.

The brake shoe 2 is constructed to be resiliently deformable when the actuating arrangement 9 applies an actuating load to radially expand the shoe. Accordingly, upon release of the actuating load, the shoe contracts radially. The construction of the brake shoe 2 is such that the shoe ends 28 remain firmly in contact with the groove 22 at all times and particularly in the inoperative condition of the drum brake assembly. The construction of the brake shoe 2 and the operation of the drum brake assembly are described fully in U.S. Pat. No. 5,246,093. The specification of that patent is therefore incorporated herein by cross-reference, for reference if further detail is required.

Figure 3:
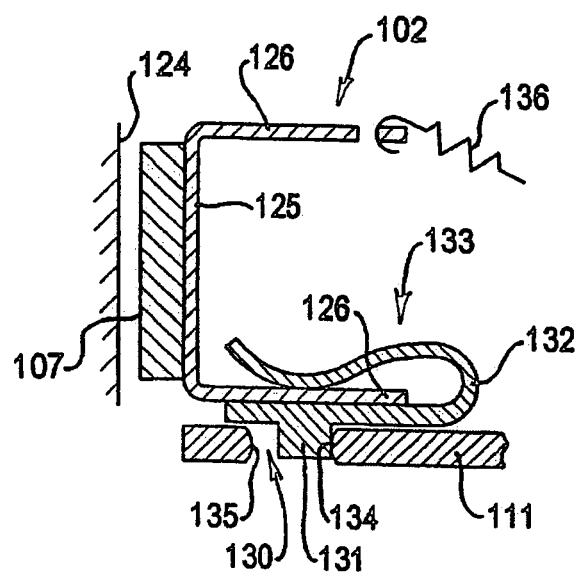
FIG. 3 is a cross-sectional view of a portion of the drum brake in accordance with an embodiment of the present invention taken in the area.
Figure 4:
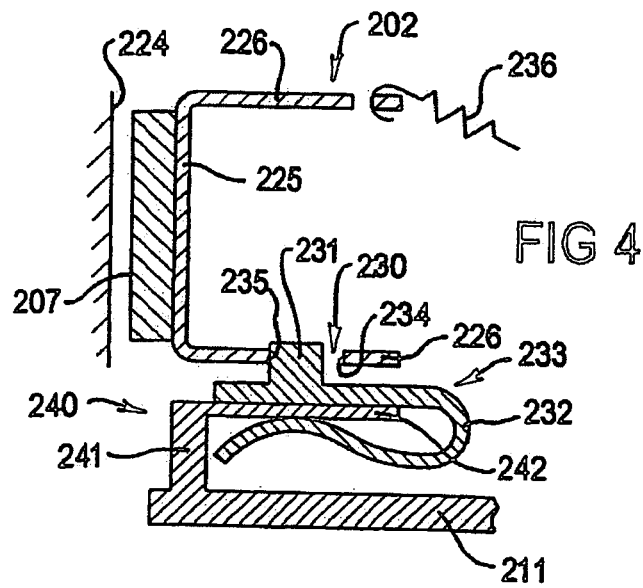
FIGS. 4–6 are cross-sectional views of additional embodiment of the present invention.
Figure 5:
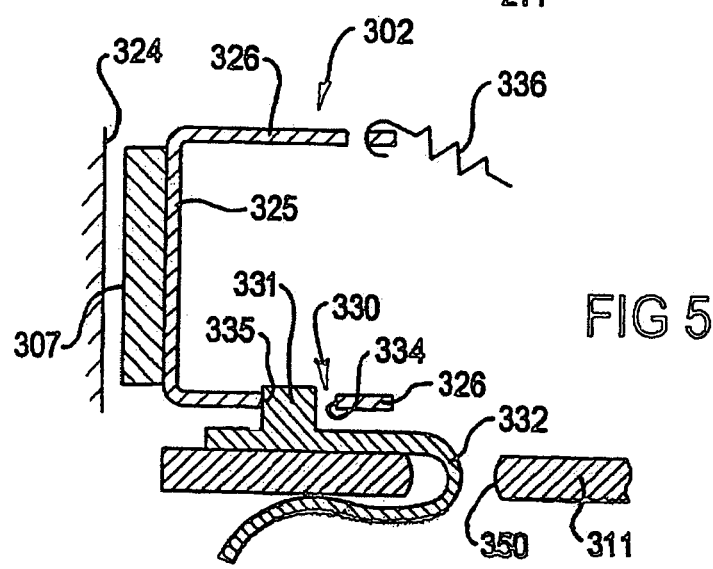

FIG. 3 illustrates one form of the invention and is a cross-sectional view through the area indicated by the line III—III of prior art FIG. 2, i.e., along the rims outer radial periphery. More specifically, FIG. 3 as well as FIGS. 4 and 5 are partial cross-sectional views of a drum brake assembly as shown in FIG. 2 with the inclusion of an embodiment of the present invention. The present invention being located at an outer periphery of the drum brake assembly for facilitating engagement with drum braking surface 124. Like parts are therefore given the same reference numeral, plus 100. Accordingly, FIG. 3 shows a channel section brake shoe 102 having a web 125 and a pair of flanges 126 depending therefrom radially inwardly. A friction lining 107 is fixed to the radially outer surface of the web 125 and is disposed in facing relationship with a drum braking surface 124. The brake shoe 102 is located adjacent the backing plate 111, which includes abutment means in the form of an opening 130.

Disposed within the opening 130 is a projection 131, which projects from a body 132 which is formed as a spring clip about the flange 126 as shown. The projection 131 and the body 132 constitute engagement means hereinafter referred to as an engagement member 133. The spring clip form of the body 132 is constructed to securely fasten the body to the flange 126 adjacent the backing plate 111. The engagement means and the abutment means constitute the positioning means of the invention.

Figure 3A:
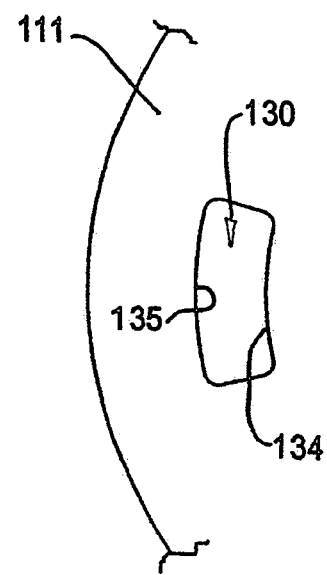
FIG. 3a is a partial plain view of a backing plate at a peripheral radial edge according to one embodiment of the present invention.

The projection 131 is substantially circular in plan view, while the opening 130 is of any suitable shape, such as circular or elongate. FIG. 3a is a plan view of a part of the backing plate 111 which shows the opening 130 as having an elongate shape. The important characteristic of the opening 130, is that it defines a pair of radially spaced abutments 134 and 135 and that the projection 131 is movable into engagement with the respective abutments 134 and 135 at points of brake shoe radial contraction and expansion. In the position shown in FIG. 3, the drum brake assembly is in the inoperative condition, in that the projection 131 is engaged against the radially inner abutment 134 and as shown, the friction lining 107 is spaced from the drum braking surface 124 at the set running clearance. The elongate shape of the opening 130 also advantageously accommodates circumferential movement of the projection 131 therewithin, which, as discussed earlier, typically occurs during brake application of a single piece brake shoe.

The arrangement shown in FIG. 3 preferably is also provided symmetrically on the other side of the centreline shown in FIG. 2, which extends between the opposed ends 28 of the brake shoe 2. By providing the two arrangements on either side of the centre line, preferably symmetrically, the brake shoe 102 can be positively positioned in the inoperative condition with clearance between the friction lining and the drum braking surface.

The brake shoe 102 will return to engagement with the radially inner abutment 134 either under its own resilience, or in combination with further biasing means. The further biasing means may take any suitable form, such as a coil spring or springs that extend in contact between the brake shoe 102 and the backing plate 111. The further biasing means may include two coil springs for example, connected to the brake shoe at or in the region of each of the engagement members. The biasing means alternatively may include more than two springs, disposed in any suitable manner about the brake shoe and in connection with the backing plate. The attachment point of the spring or springs to the brake shoe 102 may be at the flange 126 remote from the backing pate 111, and in that arrangement the or each spring would exert a force on the brake shoe towards the backing plate. Thus, the hold down spring 45 of FIG. 2 may not be required. A single spring would preferably be connected to the brake shoe along the centreline of FIG. 2 particularly in the event that the positioning means is provided symmetrically on either side of the centre line. Alternatively, a pair of springs may extend from the flange 126 remote from the backing plate 111 in the region of the engagement members 133 and one of the pair of springs 136 of this arrangement is shown in FIG. 3. Whatever biasing means is employed, the return bias strength must be lower than that which would displace the engagement member 133 on the flange 126.

The arrangement of FIG. 3 advantageously permits compensation for friction lining wear in the friction lining 107 in the following manner. The radial extent of the opening 130 is sized to permit radial movement of the projection 131 radially outwardly away from the abutment 134 into engagement with the abutment 135. The movement between abutments is about equal to the desired running clearance between the friction lining 107 and the drum braking surface 124, so that the projection 131 engages the outer abutment 135 at the same time as the friction lining engages the drum braking surface 124 in an unworn friction lining. However, the engagement of the projection 131 with the abutment 135 is not intended to resist proper engagement between the friction lining 107 and the drum braking surface 124 when the friction lining has worn. Rather, that engagement operates to shift the position of the engagement member 133 relative to the flange 126, and thereby provide compensation as the friction lining 107 wears.

Wear compensation is provided as follows. The brake shoe 102 is expanded radially to engage the friction lining 107 with the drum braking surface 124. When that engagement occurs, the projection 131 engages the outer abutment 135. When the friction lining 107 wears, the projection 131 will engage the abutment 135 in advance of the friction lining 107 engaging the drum braking surface 124. The force with which the body 132 is fixed against the flange 126 is not sufficient to prevent further radial expansion of the brake shoe 102 toward the drum braking surface 124, but because the abutment 135 is fixed, the engagement member 133 will be forcibly shifted relative to the flange 126 radially inwardly. When the brake actuating load is released and the brake shoe 102 contracts radially, then the projection 131 will shift from engagement with the outer abutment 135 and return to engagement with the inner abutment 134. However, because of the radial shift of the engagement member 133, and because the distance the projection 131 can travel between the outer and inner abutments 134 and 135 is fixed, the brake shoe 102 can contract radially a lesser amount than before friction lining wear and thus the web 125 is positioned closer to the drum braking surface 124. That closer positioning compensates for friction lining wear by maintaining the radially outer surface of the friction lining at a set distance from the drum braking surface 124 at all times.

Figure 6:
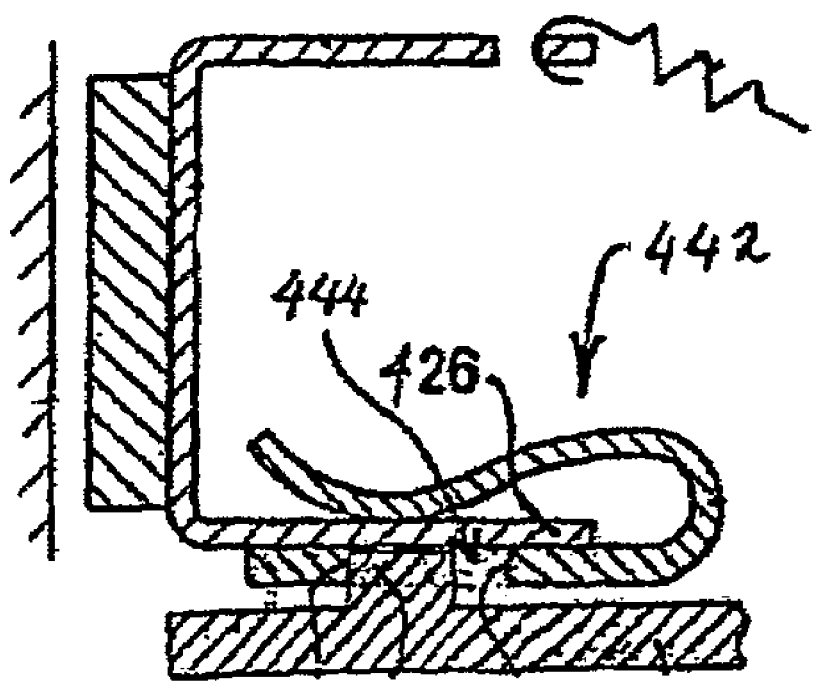

Alternatively, if the engagement member is not the displaceable member (FIG. 6), the projection 440 could be formed depending directly from the flange or the backing plate 411 (as shown in FIG. 6), again say by punching or integral connection. And the abutment arrangement 444 is formed as a component part which is fixed to the backing plate or flange 426 and that part may be formed as the displaceable member, say as a spring clip 442. Either of the engagement members or the abutment arrangement can conveniently be attached to or formed on the first flange for cooperation with the other of the engagement member or the abutment arrangement formed in or attached to the backing plate preferably at a position which underlies the first flange.

An alternative arrangement that achieves the same functional characteristics as the FIG. 3 embodiment, but by a different constructional arrangement, is shown in FIG. 4. This arrangement can be positioned at the same positions as the FIG. 3 arrangement described in relation to FIG. 2. Like FIG. 3, the FIG. 4 arrangement is a cross-sectional view taken through the section III—III of FIG. 2.

In FIG. 4, the like parts from FIG. 3 have the same reference numeral, plus 100. Accordingly, in FIG. 4, a brake shoe 202 is shown having a central web 225 and a pair of radially inwardly extending flanges 226 depending from side edges thereof. The brake shoe 202 has a friction lining 207 attached to the radially outer surface of the web 225 in facing relationship with the drum braking surface 224. The brake shoe 202 is mounted adjacent a backing plate 211 and extending from the backing plate is a mounting facility 240, which comprises an axial extension 241 and a radial extension 242 depending therefrom. Mounted to the mounting facility 240 is an engagement member 233, which has a projection 231 and a body 232 formed as spring clip. The flange 226 adjacent the radial extension 242 includes an opening 230 for receipt of the projection 231 and the opening 230 defines opposed inner and outer abutments 234 and 235. The operation of the FIG. 4 arrangement is similar to the FIG. 3 arrangement, in that the projection 231 is engageable with the inner and outer abutments 234 and 235 in the operative and inoperative drum brake assembly conditions respectively. It is to be noted however, that this is an opposite sequence of engagement compared to the FIG. 3 arrangement. Likewise, the engagement member 233 is displaceable to compensate for friction lining wear, but in the FIG. 4 arrangement, the displacement is on the radial extension 242 of the mounting facility 240.

As shown in FIG. 4, the mounting facility 240 is formed integrally with the backing plate 211. In an alternative arrangement, the mounting facility may be connected to the backing plate by any suitable means such as by welding bolting or riveting, or by threaded engagement or friction fit. The radial extension 242 could, for installation convenience, be of circular disc form and be connected centrally in the axial extension 241, so that there is no orientation difficulty in installing the mounting facility as a separate component to the backing plate.

The spring load of the engagement members 133 and 233 against the brake shoe flange 126 (FIG. 3) or the radial member 242 (FIG. 4) must be sufficient to restrain the respective engagement members against displacement under the load experienced in the inoperative condition, but to allow displacement in the operative condition to compensate for friction lining wear. The load experienced by the displacement members in the inoperative condition includes the resilient return load of the single piece brake show and any biasing load that may also be applied. The load may also include dynamic loads resulting from vibration. The loads typically will be substantially less than the actuating load to initiate engagement between the friction lining and the drum braking surface and thus, the required load for mounting the engagement member will not interfere with brake application.

A further alternative arrangement is illustrated in FIG. 5. Again, all like parts with FIG. 3 have the same reference numeral, plus 200. It will be readily apparent as to those like features, and therefore detailed discussion will relate only to areas of difference. In the FIG. 5 embodiment, an opening 350 is formed in the backing plate 311 for receipt of the engagement member 333. The engagement member 333 is formed as a spring clip to engage against opposite sides of the backing plate 311. The arrangement operates similar to the previous FIG. 3 and 4 arrangements, in that the engagement member locates the brake shoe 302 in the inoperative drum brake condition and is displaceable in the operative condition relative to the backing plate 311 to compensate for friction lining wear.

The arrangements illustrated in FIGS. 3 to 5 all show the engagement member as a spring clip, but it is to be appreciated that the spring clip form is just an example of the type of form the engagement member could take and various other forms are within the scope of the present invention.

The invention described herein is susceptible to variations, modifications and/or additions other than those specifically described and it is to be understood that the invention includes all such variations, modifications and/or additions which fall within the scope of the following claims.

The invention claimed is:

1. A drum brake assembly comprising:
a rotatable drum having a radially extending inner drum braking surface;
a brake shoe of single piece construction and of generally circular loop form mounted within said rotatable drum, said brake shoe having a radially outer face, at least one flange and two separate and opposed ends;
a backing plate against which said brake shoe is mounted;
a friction lining mounted to said outer face in facing relationship to said radially inner drum braking surface;
an actuator positioned between said ends and adapted to enlarge the separation between said ends to thereby cause radial expansion of said brake shoe from an inoperative brake off condition, in which there is clearance between said friction lining and said drum braking surface, to an operative brake on condition, in which said friction lining engages said drum braking surface;
an elongate web having a radially outer face which is adapted to form said radially outer face of said brake shoe, wherein said brake shoe flange co-extends with said elongate web and projects radially inward from said elongate web;
a positioning arrangement for positioning said brake shoe within said rotatable drum in the inoperative condition against lateral movement into engagement with said rotatable drum braking surface, to provide for complete clearance between said friction lining and said drum braking surface in the inoperative condition, said positioning arrangement including an engagement member associated with one of said brake shoe flange and said backing plate, for engagement with an abutment arrangement associated with the other of said brake shoe flange and said backing plate; said abutment arrangement including a radially inner abutment and a radially outer abutment, wherein said engagement member is arranged for engagement with said radially inner abutment in the inoperative condition of the drum brake assembly to position said friction lining away from said drum braking surface, wherein said engagement member is arranged for engagement with said radially outer abutment when said brake shoe is radially expanded from the inoperative condition through a set running clearance between said friction lining and said drum braking surface to the operative condition of the drum brake assembly, one of said engagement member and said abutment arrangement being formed as a displaceable member which is displaceable radially relative to said brake shoe flange or said backing plate with which it is associated for the purpose of maintaining the set running clearance between said friction lining and said drum braking surface upon lining wear; and
a biasing arrangement for facilitating engagement between said engagement member and said abutment arrangement in the inoperative condition by biasing said brake shoe to return to the inoperative condition.

2. The drum brake assembly according to claim 1, wherein said biasing arrangement is formed at least in part, by the construction of said brake shoe, and where said brake shoe is constructed to resiliently distort during radial expansion under brake actuation and to radially contract under brake release.

3. The drum brake assembly according to claim 2, wherein said biasing arrangement further includes a spring.

4. The drum brake assembly according to claim 1, wherein said positioning arrangement provides for engagement between said engagement member and said abutment arrangement at two or more positions or regions about said brake shoe.

5. The drum brake assembly according to claim 4, wherein said two engagement positions between said engagement member and said abutment member are spaced symmetrically about a centre-line of said brake shoe which extends between said opposed ends of said brake shoe and through the centre of said brake shoe.

6. The drum brake assembly according to claim 5, wherein said two engagement positions are spaced apart in said region between 30°–60° on either side of said centre-line.

7. The drum brake assembly according to claim 1, wherein said displaceable member comprises a spring clip fitted to one of said backing plate and said brake shoe flange and is secured thereto under spring load.

8. The drum brake assembly according to claim 7, wherein said backing plate includes an opening for receipt of said spring clip, and said spring clip is arranged in said opening to engage opposite sides of said backing plate.

9. The drum brake assembly according to claim 7, wherein said backing plate includes a mounting facility extending therefrom for mounting said spring clip.

10. The drum brake assembly according to claim 7, wherein said spring clip is arranged to engage opposite sides of said brake shoe flange.

11. The drum brake assembly according to claim 1, wherein said engagement member includes a projection for abutting engagement with said abutment arrangement.

12. The drum brake assembly according to claim 11, wherein said engagement member is formed as said displaceable member, and wherein said projection is part of a mounting section of said displaceable member which facilitates mounting of said displaceable member to one of said backing plate and said brake shoe flange.

13. The drum brake assembly according to claim 11, wherein said projection is formed to project from one of said backing plate and said brake shoe flange.

14. The drum brake assembly according to claim 11, wherein said projection has a "fish back," oval, elliptical, square or rectangular configuration.

15. The drum brake assembly according to claim 1, wherein said abutment arrangement is a circumferential or tangential groove opening or slot opening which defines opposed faces for engagement by said engagement member, and which permits circumferential movement of said brake shoe.

16. The drum brake assembly according to claim 15, wherein said opening is disposed within said flange or said backing plate.

17. The drum brake assembly according to claim 15, wherein said opening is disposed within a separate component part fixed to said flange or said backing plate.

18. The drum brake assembly according to claim 17, wherein said component part is fixed to said flange or said backing plate as said displaceable member.

19. The drum brake assembly according to claim 1, wherein said brake shoe includes a pair of generally parallel flanges extending radially inwards from opposite side edges of said elongate web, wherein in use, a first of said pair of parallel flanges is disposed against or adjacent said backing plate and a second of said pair of parallel flanges is spaced axially away from said backing plate, wherein one of said engagement member and said abutment arrangement is associated with said first of said pair of parallel flanges and the other of said engagement member and said abutment arrangement is associated with said backing plate.

* * * * *